US007003606B2

(12) United States Patent
Fukushima et al.

(10) Patent No.: US 7,003,606 B2
(45) Date of Patent: *Feb. 21, 2006

(54) ELECTRONIC DEVICE, METHOD FOR USING ELECTRONIC DEVICE, AND ELECTRONIC DEVICE SYSTEM FOR RESERVING BUS USAGE TIME ON A BUS TO CONDUCT COMMUNICATIONS BETWEEN ELECTRONIC DEVICES

(75) Inventors: Shinichiro Fukushima, Yokohama (JP); Takahiko Nozoe, Yokohama (JP); Tsukasa Hasegawa, Hiratsuka (JP); Hidefumi Gotou, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/847,874

(22) Filed: May 19, 2004

(65) Prior Publication Data

US 2004/0215855 A1 Oct. 28, 2004

Related U.S. Application Data

(63) Continuation of application No. 09/381,395, filed as application No. PCT/JP97/00933 on Mar. 21, 1997, now Pat. No. 6,757,765.

(51) Int. Cl.
*G06F 13/00* (2006.01)

(52) U.S. Cl. .................. 710/107; 710/110; 710/72; 710/240; 370/395

(58) Field of Classification Search ........ 710/104–107, 710/110–112, 117, 124, 241–244, 305–306, 710/62–64, 72, 313, 308; 709/103, 107, 709/234–235; 370/395
See application file for complete search history.

(56) References Cited

U.S. PATENT DOCUMENTS 4,805,106 A 2/1989 Pfeifer .................. 710/100

(Continued)

FOREIGN PATENT DOCUMENTS

EP 0426323 A3 5/1991

(Continued)

OTHER PUBLICATIONS

"The IEEE 1394 High Speed Serial Bus" by R. Bloks, Phillips Journal of Research, vol. 50, No. 1 / 2, pp. 209-216, Jul. 1996.

Primary Examiner—Tim Vo
Assistant Examiner—Raymond N Phan
(74) Attorney, Agent, or Firm—Mattingly, Stanger, Malur & Brundidge, P.C.

(57) ABSTRACT

An IRD 103 supplies broadcasting data on a bus in a desired time period. When the IRD 103 performs a reservation of the bus usage, the IRD 103 requests current bus usage information and information of the bus reservation from all devices connected by the bus, such as a DVD 104, a D-VTR 101, a D-VTR 102, a CAM 105, a TV 100, and a isochronous manager 107 of the D-VTR 101. The isochronous manager 107 and each device answer by sending the bus usage information and reservation information to the IRD 103. The IRD 103 judges a possibility of the reservation from the answer information. If the reservation is possible, it performs the reservation operation. If the reservation is impossible, then the reason is displayed on a TV 100. Therefore, it is possible to prevent a usage of a device that excesses the bus transferring capacity.

10 Claims, 13 Drawing Sheets

U.S. PATENT DOCUMENTS

| | | | |
|---|---|---|---|
| 5,001,707 A | 3/1991 | Kositpaiboon et al. | 370/94.1 |
| 5,052,029 A | 9/1991 | James et al. | |
| 5,457,446 A | 10/1995 | Yamamoto | 340/825.24 |
| 5,506,969 A | 4/1996 | Wall et al. | 710/107 |
| 5,579,486 A | 11/1996 | Oprescu et al. | 709/200 |
| 5,621,898 A | 4/1997 | Wooten | |
| 5,673,393 A | 9/1997 | Marshall et al. | 709/200 |
| 5,689,507 A | 11/1997 | Bloks et al. | 370/389 |
| 5,784,569 A | 7/1998 | Miller et al. | 709/200 |
| 5,819,043 A | 10/1998 | Baugher et al. | 709/200 |
| 5,828,656 A | 10/1998 | Sato et al. | 370/254 |
| 5,835,714 A | 11/1998 | Herzl et al. | 709/200 |
| 5,951,664 A | 9/1999 | Lambretch et al. | 710/107 |
| 5,978,875 A | 11/1999 | Asano et al. | 710/107 |
| 6,058,450 A | 5/2000 | LaBerge | 710/107 |
| 6,073,197 A | 6/2000 | Stewart | 710/104 |
| 6,131,111 A | 10/2000 | Yoshino et al. | 709/204 |
| 6,185,360 B1 | 2/2001 | Inoue | 386/46 |
| 6,307,842 B1 | 10/2001 | Nakata et al. | 370/254 |
| 6,757,765 B1 * | 6/2004 | Fukushima et al. | 710/107 |

FOREIGN PATENT DOCUMENTS

| | | |
|---|---|---|
| EP | 0426323 B1 | 1/1996 |
| EP | 0715261 A1 | 6/1996 |
| EP | 0921472 | 3/1997 |
| EP | 0977401 | 3/1997 |
| JP | 3147151 | 6/1991 |
| JP | 4346598 | 12/1992 |
| JP | 5242002 | 9/1993 |
| JP | 6244842 | 9/1994 |
| JP | 7336374 | 12/1995 |
| JP | 9125670 | 5/1996 |
| JP | 8228200 | 9/1996 |
| JP | 927814 A | 1/1997 |
| JP | 951344 A | 2/1997 |

* cited by examiner

| Reservation time zone (800) | Reservation bus width (801) | Reservation channel (802) |
|---|---|---|
| Reservation time zone | Reservation bus width | Reservation channel |
| ⋮ | ⋮ | ⋮ |

FIG.9

| Immediate communication bus width (900) | Immediate communication channel (901) |
|---|---|
| Immediate communication bus width | Immediate communication channel |
| ⋮ | ⋮ |

FIG.10

| Current available bus width (1000) | Channel information (1001) |
|---|---| ns
ELECTRONIC DEVICE, METHOD FOR USING ELECTRONIC DEVICE, AND ELECTRONIC DEVICE SYSTEM FOR RESERVING BUS USAGE TIME ON A BUS TO CONDUCT COMMUNICATIONS BETWEEN ELECTRONIC DEVICES

The present application is a continuation of application Ser. No. 09/381,395, filed Dec. 13, 1999 which is a 371 of PCT/JP97/00933, filed March 21, now U.S. Pat. No. 6,757, 765, the contents of which are incorporated herein by reference.

TECHNICAL FIELD

This invention relates to a technique for controlling communication in an electronic device system, including devices, such as an Audio Visual device (hereinafter, "AV device") that deals with visual information and audio information, and an information processing device, connected by a communication bus. Especially, the technique operates to prevent a use of the electronic device system that exceeds data the transfer capacity of the communication bus.

BACKGROUND OF THE INVENTION

The IEEE 1394 serial bus is thought of as a network system that enables a transmission of data by isochronous communication and a transmission of a control signal by asynchronous communication between an AV device and an information processing device. The IEEE 1394 serial bus is standardized to "IEEE STD 1394-1995" as "IEEE STANDARD FOR A HIGH PERFORMANCE SERIAL BUS." As an example of using IEEE 1394 serial buses, Japanese published unexamined patent application No. H08-47058 describes that "a method for selecting input devices" that can display only the identification of a device that is able to output an information signal, as an input available device in a system that is connected to a plurality of electronic devices by way of a communication bus.

Further, an "AV/C Digital Interface Command Set", which includes control signals to control an AV device for playback and recording of AV data by using a 1394 IEEE serial bus, has been opened to the public by the "1394 Trade Association." However, in the standard technique for the IEEE 1394 serial bus, in case a plurality of electronic devices perform isochronous communication simultaneously, the available band width and number of channels of the bus are exceeded, and so some of the electronic devices that try to perform communication can not use the bus because of the short available band width and limited number of channels of the bus.

Consider a case wherein, in a network, for example, in which a digital receiver IRD (hereinafter "IRD") is connected to a device such as a digital videotape recorder D-VTR (hereinafter "D-VTR"), a reserved recording is performed by the network. When the other electronic devices that are connected in the network use the bus during the reserved recording time, and the bus width that the IRD wants to use is larger than the available bus width at that time, the IRD cannot secure the necessary bus width. As a result, the reserved recording cannot be performed because data cannot be satisfactorily transmitted from the IRD to the D-VTR.

Further, in the input device selection method and AV/C Digital Interface Command Set, a method of selecting the input device at the present time, and a method of transmitting the data and the control signals at the present time are only considered.

SUMMARY OF THE INVENTION

The main object of the present invention is to solve the foregoing problems.

In the case of an electronic device system in which an AV device and an information processing device are connected by a communication bus, and a reserved playback time and a reserved picture recording time are established, an inquiry is made of the connected devices to obtain information about each reservation. Then, on the basis of answer information received from the devices, it is determined how to perform a reservation for a communication resource, so that a usage that exceeds the transfer capacity of the communication bus is prevented, thereby allowing the reservation by the communication resource to be accepted.

Further, in accordance with this invention, in case a reservation or an immediate communication is impossible, the reason for this can be displayed. In addition, in case usage of a bus is prohibited because other devices have reserved the bus, the reason for this can be displayed.

This invention relates in particular to a system in which a device, such as AV device, is connected to an information processing device by a bus. In order to communicate in a reliable manner on the bus, a device that can perform data reproduction in the system inquires of the connected devices for reservation information. Responsive to an answer from the connected devices, the device has an element that can judge the availability of the bus transferring capacity not so as not to exceed the capacity of the bus. Therefore, a device that wants to use the bus can perform an information transfer. Further, by judging whether the above-mentioned usage of the bus is available, in a case where it is impossible to use the bus, the device has an element that communicates the reason to a video display device. Therefore, the device can perform an appropriate setting for the reservation to avoid problems in the use of the bus.

BRIEF DESCRIPTION OF THE DRAWINGS

FIG. 8 is a diagram illustrating an example of a stored reservation data structure according to the preferred embodiment of the invention.

FIG. 9 is a diagram illustrating an example of a stored immediate communication data structure according to the preferred embodiment of the invention.

FIG. 10 is a diagram illustrating an example of a bus information data structure according to the preferred embodiment of the invention.

BEST MODE(S) FOR CARRYING OUT THE INVENTION

With reference to the drawings, a preferred embodiment of the present invention will be explained. In the preferred embodiment of the present invention, especially, one that involves a system of electronic devices, such as an AV device and an information processing device, that are connected by a bus, which is available for isochronous communication, like an IEEE 1394 bus, it is possible to effect a bus usage reservation and to effect immediate isochronous communication in a trouble free manner.

The isochronous communication on a IEEE 1394 serial bus is performed approximately every 8 KHz (KILO-HERTZ). That is a secured data transmission mode of a transmission band. The data transfer is performed by packet transmission, and the packet data consists of a header part and a data part, wherein the header part stores information, such as a channel number and a transmission data size, and the data part stores transmission data in units of 4 bytes. Further, in IEEE 1394, there is an asynchronous data transmission mode that is called asynchronous communication. The asynchronous communication mode is mainly used for transmission of a command.

Figure 1:
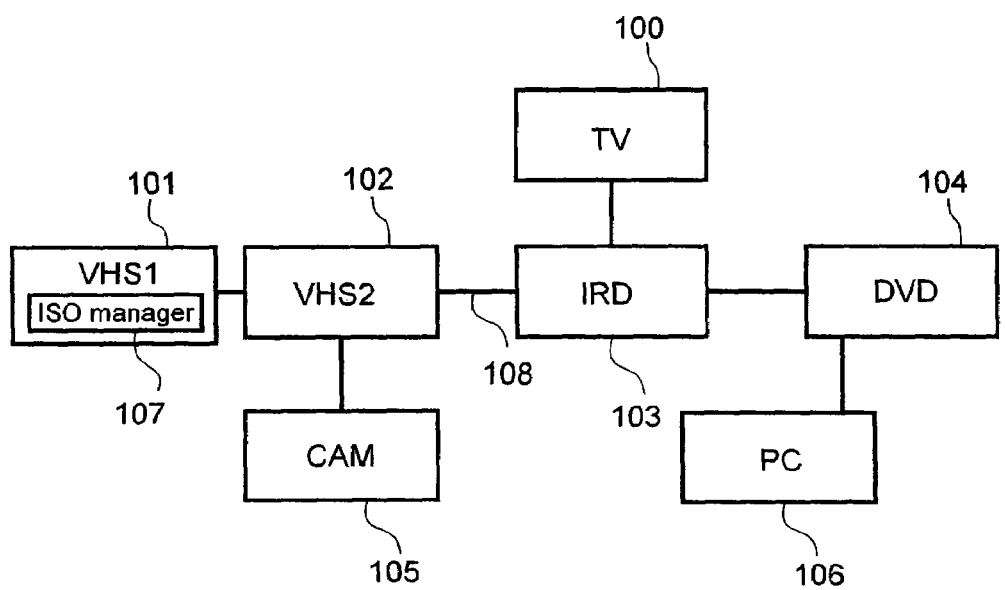
FIG. 1 is a block diagram illustrating an electronic device system according to a preferred embodiment of the invention.

FIG. 1 is a block diagram illustrating a network system according to a preferred embodiment of the invention. A TV 100 in the form of a television receiver, a D-VTR 101 and a D-VTR 102 which perform recording and reproducing of AV data, an IRD 103 which is a digital satellite broadcasting receiver, a digital video disk unit DVD 104 (hereinafter "DVD") which performs reproducing of AV data, a digital video camera CAM 105 (hereinafter "CAM") which performs recording and reproducing of AV data, and a personal computer PC 106 (hereinafter "PC") are connected by an IEEE 1394 bus cable 108. In the case of isochronous communication on the IEEE 1394 bus, one of the devices connected by the bus is used as an isochronous manager 107 so as to manage the bus width and channels. In this embodiment, the D-VTR 101 is provided with the isochronous manager 107, however, another device, such as the DVD104, could be provided with the isochronous manager function.

As disclosed in FIG. 1, the configuration of the device connection can be a daisy chain connection or a tree connection or various combinations thereof. Although it is not shown in FIG. 1, there is a case in which devices, such as a hard disk device, a printer, a scanner and an audio device, also are connected in the system.

Figure 2:
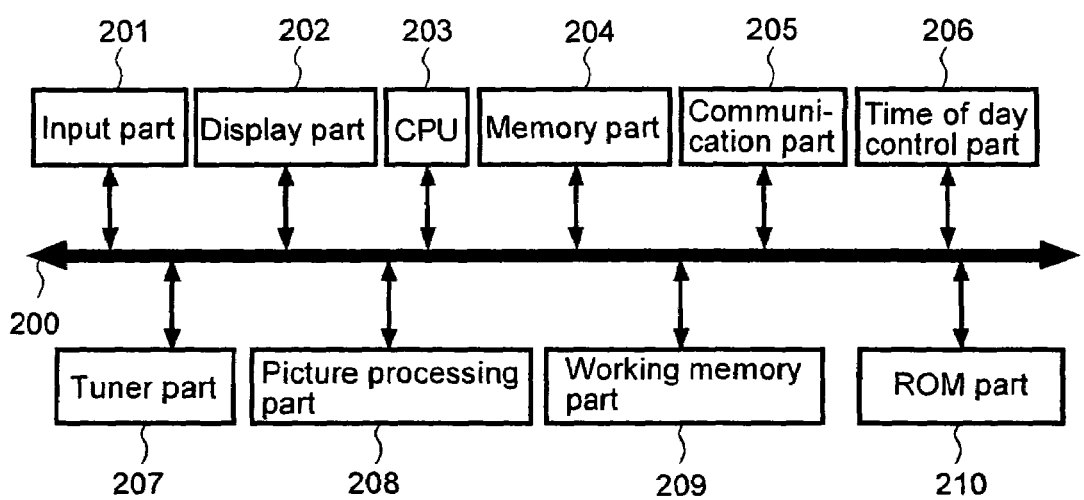
FIG. 2 is a block diagram illustrating the electronic device structure (IRD) according to the preferred embodiment of the invention.

FIG. 2 is a block diagram illustrating the internal structure of the IRD 103, which is one of the electronic devices in the system, according to this preferred embodiment of the invention. The numeral 200 designates an internal bus of the IRD. The numeral 201 designates an input unit by which reservation setting data is input. The numeral 202 designates a display unit for displaying required data relating to the reservation setting data. The numeral 203 designates a CPU that performs overall control and processing of the bus reservation of the IRD. The numeral 204 denotes a memory for storing reservation data, and for performing other memory functions. The numeral 205 designates a communication unit for communicating with other devices. The numeral 206 designates a time of day control unit for managing the time. The numeral 207 denotes a tuner for receiving a broadcast wave. The numeral 208 denotes a picture processing unit for decrypting received picture data, and so on. The numeral 209 designates a working memory for storage of working data when the CPU performs various processes. The display 202 may be located not only on the body of the IRD, but also on a remote controller, or the TV 100 may be utilized for this function.

The following cases represent ways in which a communication on the bus can be established.

(1) A case in which the bus transmission capacity (hereinafter "bus width") of a time zone in the future is secured for a bus reservation to effect a further communication.

(2) A case in which the bus width from the present time is secured immediately for an immediate communication for the duration of the communication.

While the case (1) provides bus width security for an appointed time zone, the case (2) can be thought of as providing bus width security, without an appointed time zone, from the present time.

Figure 3A:
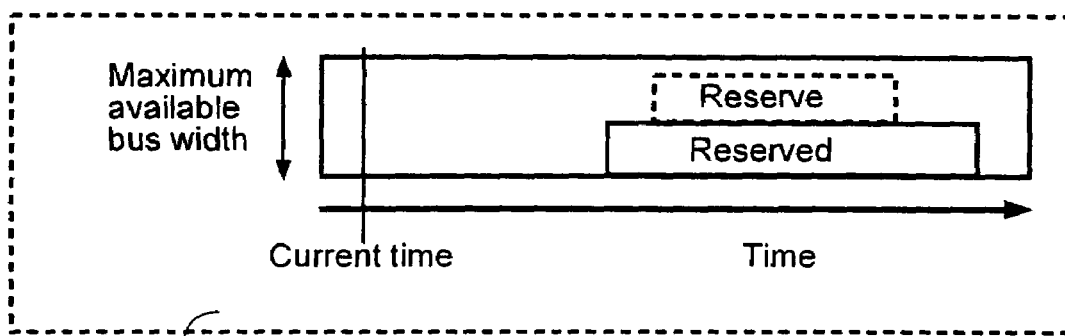
FIGS. 3(a) and 3(b) are diagrams illustrating examples for securing a bus reservation according to the preferred embodiment of the invention.
Figure 3B:
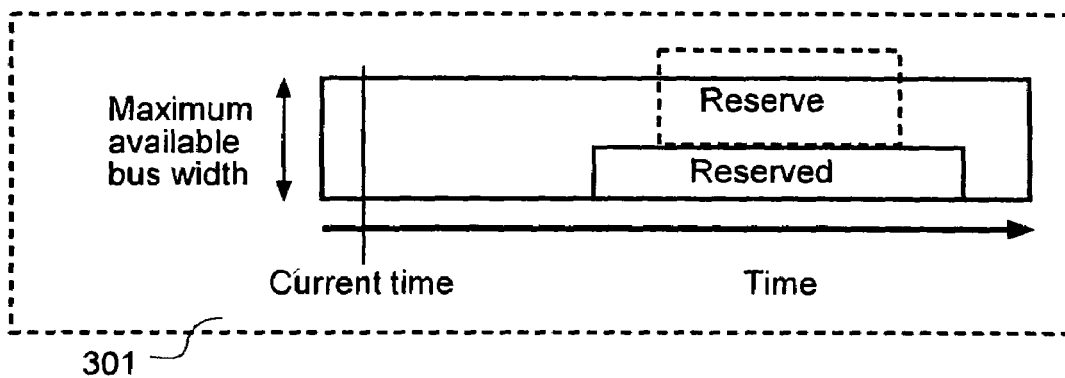

For example, in case the TRD103 wants to secure a particular bus width for a time zone in the future, as shown in FIG. 3(a) and FIG. 3(b), the following situations may be considered in the case (1).

(a) A situation in which there is an available bus width relative to the overall bus width in the time zone that is to be secured for reservation, as seen at 300 in FIG. 3(a).

(b) A situation in which there is not sufficient bus width available relative to the overall bus width in the time zone that is to be secured for reservation, as seen at 301 in FIG. 3(b).

Figure 4A:
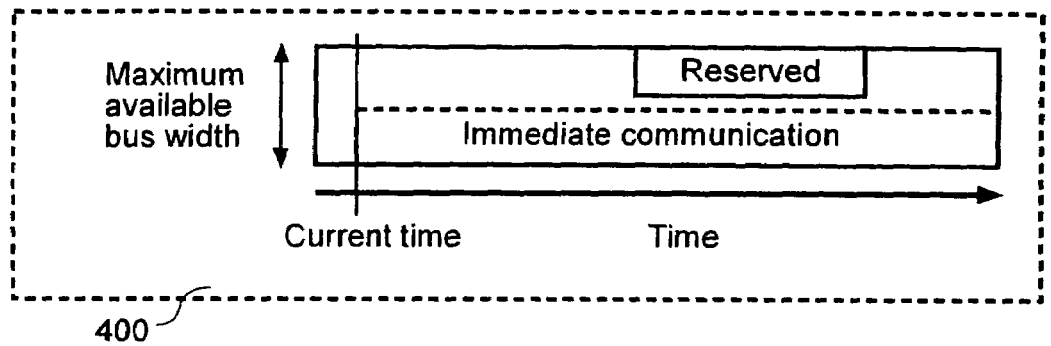
FIGS. 4(a) and 4(c) are diagrams is a drawing illustrating an example for securing immediate communication according to the preferred embodiment of the invention.
Figure 4B:
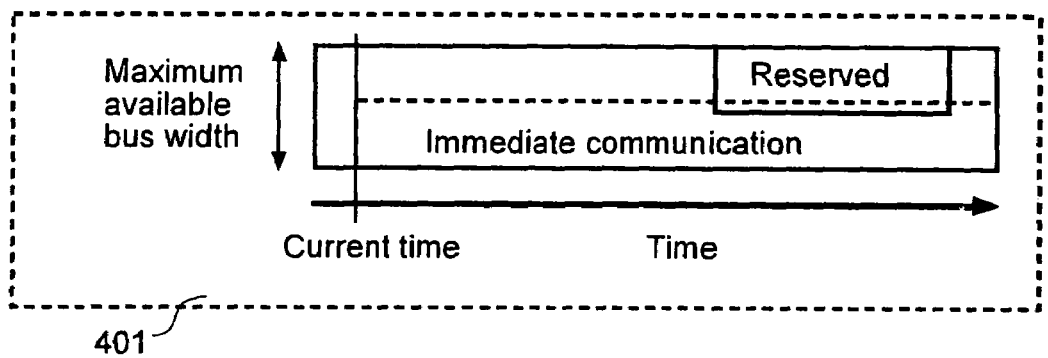
Figure 4C:
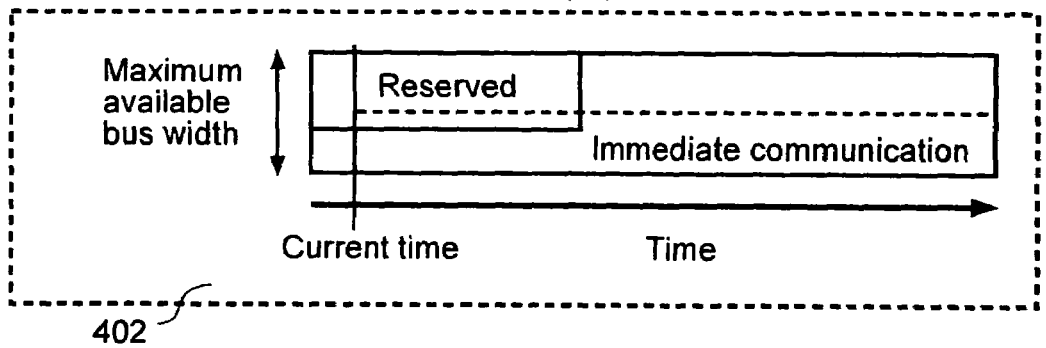

On the other hand, in case the IRD103 wants to secure a certain bus width to perform immediate communication, as shown in FIGS. 4(a), 4(b) and 4(c), the following situations may be considered in the case (2).

(c) A situation in which there is an available bus width for the present time and for a time in the future relative to the overall bus width of the time period that is to be secured immediately, as indicated at 400 in FIG. 4(*a*).

(d) A situation in which there is an available bus width for the present time, but no margin for a time in the future relative to the bus width of the time period that is to be secured immediately, as indicated at 401 in FIG. 4(*b*).

(e) A situation in which there is not sufficient bus width with at least a margin for the present time relative to the overall bus width of the time period that is to be secured immediately, as indicated at 402 in FIG. 4(*c*).

Figure 6:
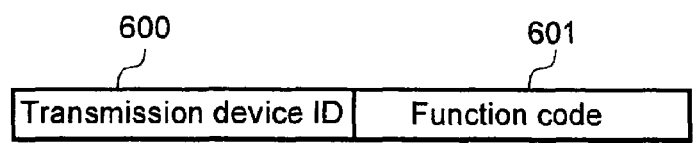
FIG. 6 is a diagram illustrating an example of a transmission data structure according to the preferred embodiment of the invention.
Figure 7:
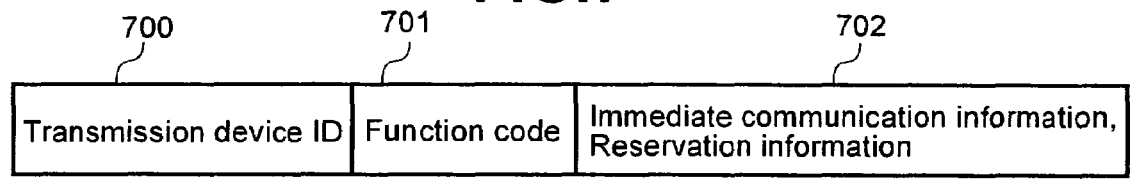
FIG. 7 is a diagram illustrating an example of a response data structure according to the preferred embodiment of the invention.

The process to secure a reservation for a communication resource for a time in the future in the case (1), will be explained with reference to the flowchart of FIG. 5, the packet structure of FIG. 6 and FIG. 7, and the storage data format of FIG. 8, FIG. 9 and FIG. 10.

First there will be an explanation of the process carried out in the case of FIG. 3(*a*). In FIG. 5, in step 500, the reservation program is called at the time of starting a reservation operation. The starting of the reservation operation involves execution of the reservation processing program stored in the ROM 210 after the CPU 203 senses actuation of a reservation starting button via the input unit 201. In step 501, the CPU 203 inquires into the bus usage and the bus reservation situation. The IRD 103 responds to the inquiry by sending a request for immediate communication information and reservation information to the isochronous manager 107 and the devices connected to the bus. At that time, as shown in FIG. 6, a packet is produced that consists of a function code representing the substance of the request, and the packet is transmitted to each device connected to the bus through the communication unit 205 as a request for information.

In step 502, an answer, including data representing the immediate communication information and the reservation information for the bus, information which represents bus usage information, is received. The answer is received by the communication unit 205, and the received data are stored in the working memory 209. For example, the communication unit 205 receives data indicating a current available bus width 1000 and channel information 1001 from the isochronous manager 107, as shown in FIG. 10, as well as answer data in the form of immediate communication information and reservation information from the connected devices, as shown at 702 of FIG. 7. In this case, for example, it will be assumed that the content of the answer data received from the isochronous manager 107 indicates that 80 MBPS of the bus is available at present. Further, it will be assumed that the answer content from the D-VTR 101 indicates that 30 MBPS of the bus width is reserved from 18:00 to 20:00 on December 14

Figure 11:
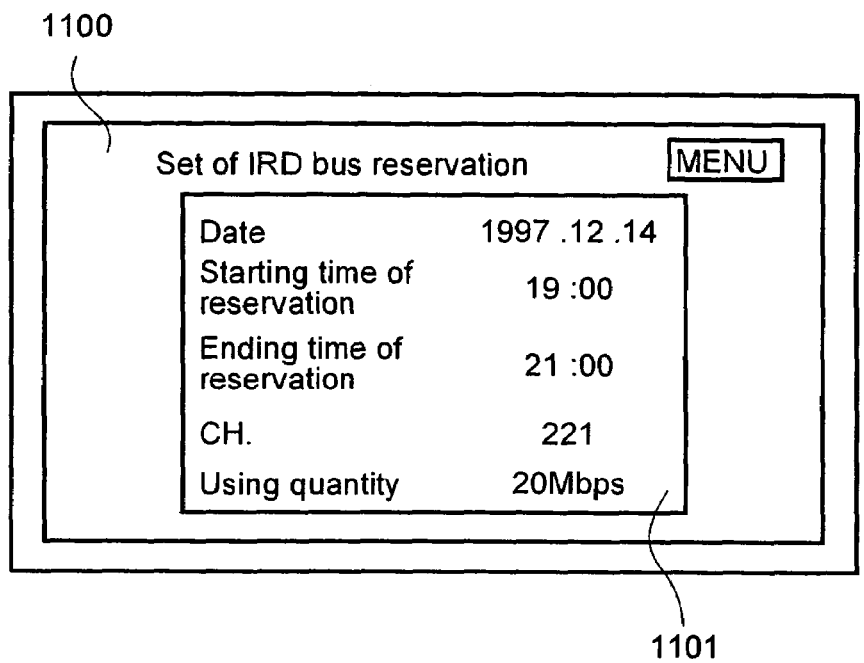
FIG. 11 is a diagram illustrating an example of a bus reservation display according to the preferred embodiment of the invention.

In step 503, a user inputs usage information indicating a desired use of the bus (hereinafter "reservation-desired data") relating to the bus usage, such as a desired time period for reservation of the bus. The data is inputted via the input unit 201 and is stored in the working memory 209. For example, as shown at 1101 of FIG. 11, the user inputs reservation-desired data, such as a bus width of 20 MBPS (MEGA BIT PER SECOND), for a period from 19:00 to 21:00 on December 14 to the IRD103.

In step 504, it is determined whether the reservation is possible. The reservation-desired data stored in the working memory unit 209, the received immediate communication information, and the received reservation information are compared. The CPU 203 performs the judgment using a scan process of examining whether the requested time period that is to be reserved is already reserved. It is also possible to subtract the bus width designated in the reservation request from the maximum bus width that is available in the requested time period and to perform the required judgment to determine if the reservation is possible by well-known processing. As seen in FIG. 3(*a*), the time period for which the D-VTR 101 is reserving the bus is within the time period that the IRD103 wants to reserve the bus for the period from 19:00 to 20:00. But, even if 20 MBPS of bus width secured in the immediate communication is considered, the overall bus width that is available for the time period in which the reservation overlaps the other usage is 50 MBPS. Therefore, it is determined that the bus width of 20 MBPS that the IRD103 wants to reserve can be reserved, and so the process advances to step 505.

In step 505, the reservation-desired data is stored as bus usage information, and then the process advances to step 506. The reservation usage information is stored to the memory 204. FIG. 8 shows an example of the stored data structure. A reservation time zone field 800 stores information indicating the reservation time period of the reserved device. A reservation bus width field 801 stores information indicating the reserved bus width. A reservation channel number field 802 stores information identifying the reserved channel number. In step 506, the reservation process is ended.

The following is an explanation of the process carried out in the case of FIG. 3(*b*). The situation is the same as that of the above-mentioned case (1), except for the availability of bus width.

Figure 12:
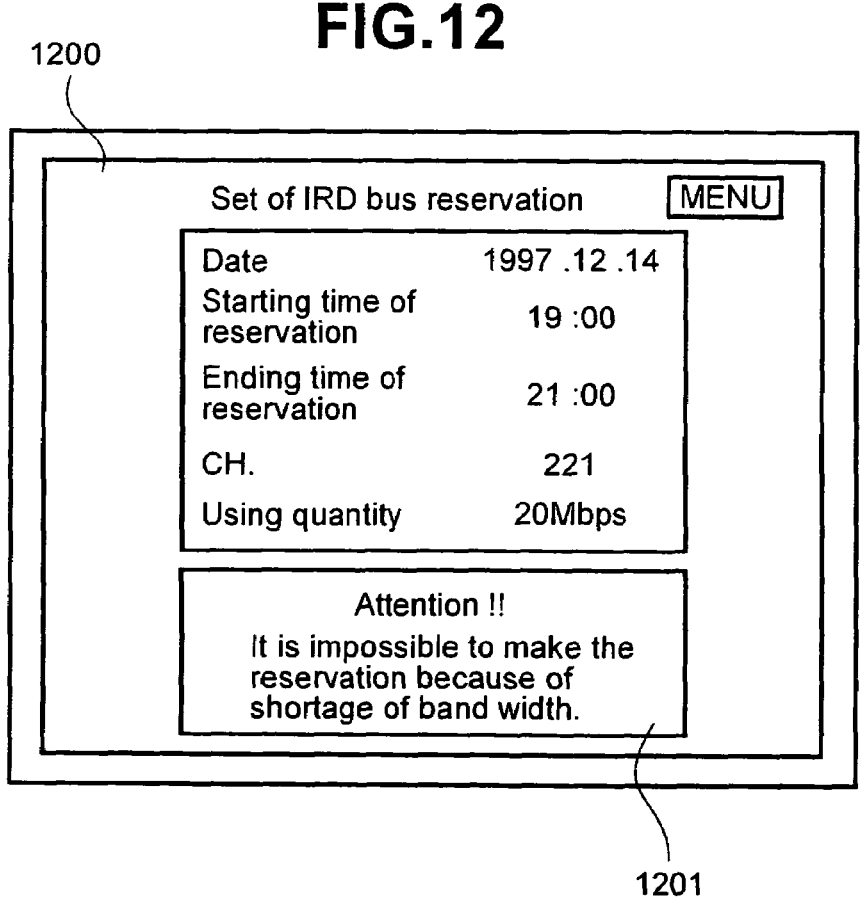
FIG. 12 is a diagram illustrating an example of a bus unavailable reservation display according to the preferred embodiment of the invention.

In step 503, a user inputs the reservation-desired data, such as a desired time period for reservation of the bus. The data is inputted via the input unit 201 and is stored in the working memory 209. However, in this case, if the IRD 103 makes a reservation that is more than 70 MBPS (MEGA BIT PER SECOND) for the time period from 19:00 to 21:00 on December 14, the bus width that is available for that time period will be insufficient. In step 504, therefore, when the possibility of reservation of the time period is considered, it is determined that the reservation is impossible, and so the process will advance to step 507. In step 507, the reason why the reservation is not possible is displayed, as seen at 1201 in FIG. 12, and the process advances to step 508.

In step 508, it determines whether the request for a reservation is to be retried or ended. For example, a character line requesting whether the reservation is to be retired or ended is displayed on the display unit 202, and then the user inputs a selection via the input unit 201. The inputted selection information is judged by the CPU 203 to determine whether the process is to advance to step 503 or to step 506. As mentioned above, the device that seeks to obtain the reservation requests reservation information from the devices connected to the bus. Then, a determination as to the possibility of obtaining the reservation is performed based upon the answer information received from other devices and the information received from the bus manager. Even in a case where a reservation cannot be granted because there already is another reservation for the same time period reserved by other devices, a reservation may be canceled by judging the priority of each user in the IRD103 and granting a reservation to the user having a higher priority.

Figure 13:
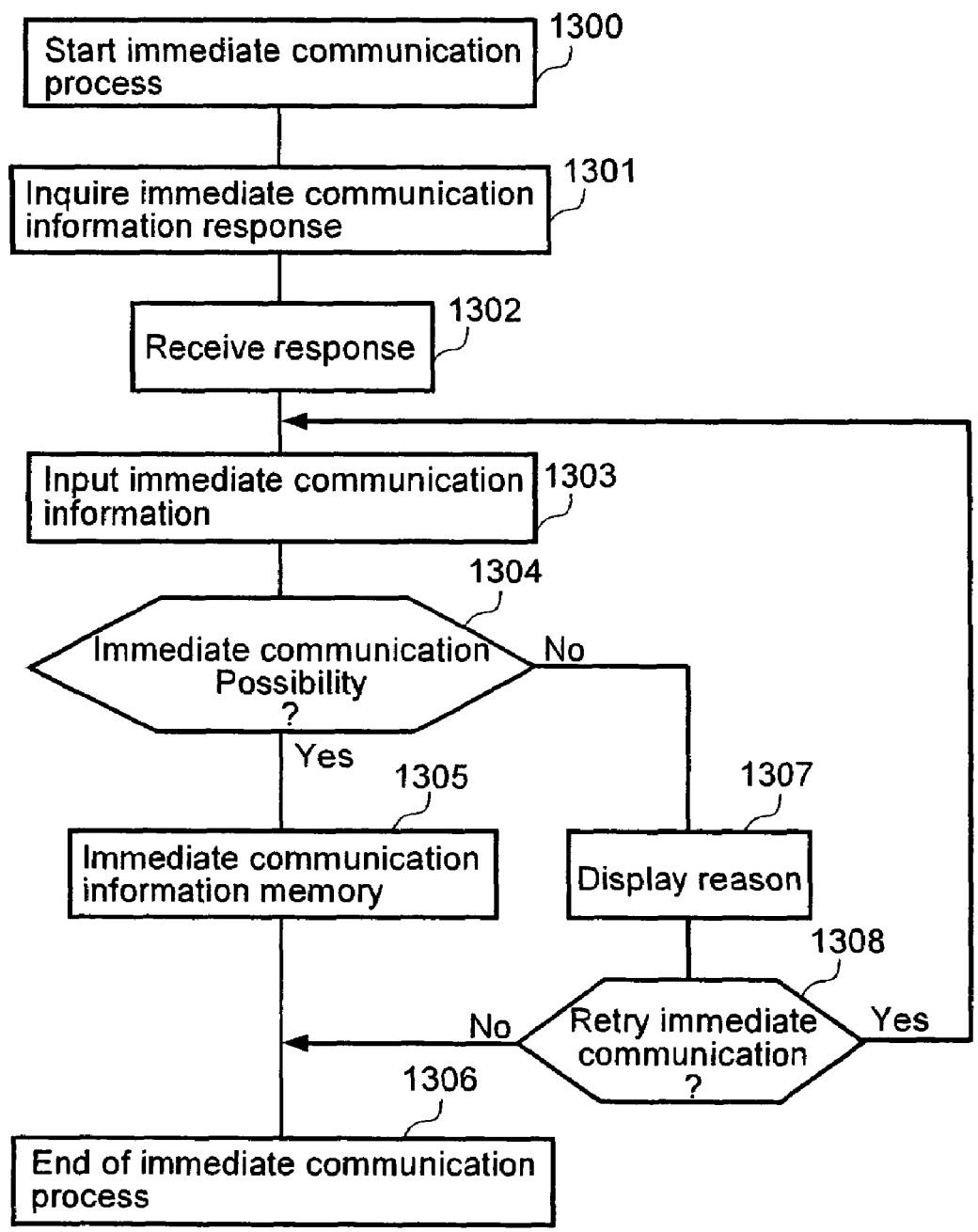
FIG. 13 is a flow chart illustrating an immediate communication process according to the preferred embodiment of the invention.

Next, the process to secure a reservation for a communication resource from the present time to effect an immediate communication in the case (2) will be explained with reference to the flowchart of FIG. 13, the packet structure of FIG. 6 and FIG. 7, and the storage data format of FIG. 8, FIG. 9 and FIG. 10.

The following is an explanation of the process carried out in the case of FIG. 4(a).

Step 1300 is performed at the time of the start of immediate communication operation. The starting of the immediate communication operation involves execution of an immediate communication processing program stored in the ROM 210 after the CPU 203 senses actuation of an immediate communication starting button via the input unit 201. In step 1301, the IRD 103 responds to an inquiry from the CPU 203 by sending a request for immediate communication information and reservation information to the isochronous manager 107 and the devices connected to the bus. Then, as shown in FIG. 6, a packet is produced that consists of a function code which is transmitted to each device connected to the bus through the communication unit 205.

In step 1302, an answer including data representing the immediate communication information and the reservation information is received in the communication unit 205, and this data is stored in the working memory unit 209. For example, the communication unit 205 receives data indicating a current available bus width 1000 and channel information 1001 from the isochronous manager 107, as shown in FIG. 10, as well as answer data in the form of immediate communication information and reservation information from the connected devices. In this case, for example, it will be supposed that the content of the answer data from the isochronous manager 107 that 80 MBPS of the bus is available at present. Further, it will be supposed that the answer content from the D-VTR 101 indicates that 30 MBPS of the bus width is reserved from 18:00 to 20:00 on December 14. In addition to that, it is supposed that the answer from the D-VTR 104 indicates that 20 MBPS of the bus width is to be used for the immediate communication.

Figure 14:
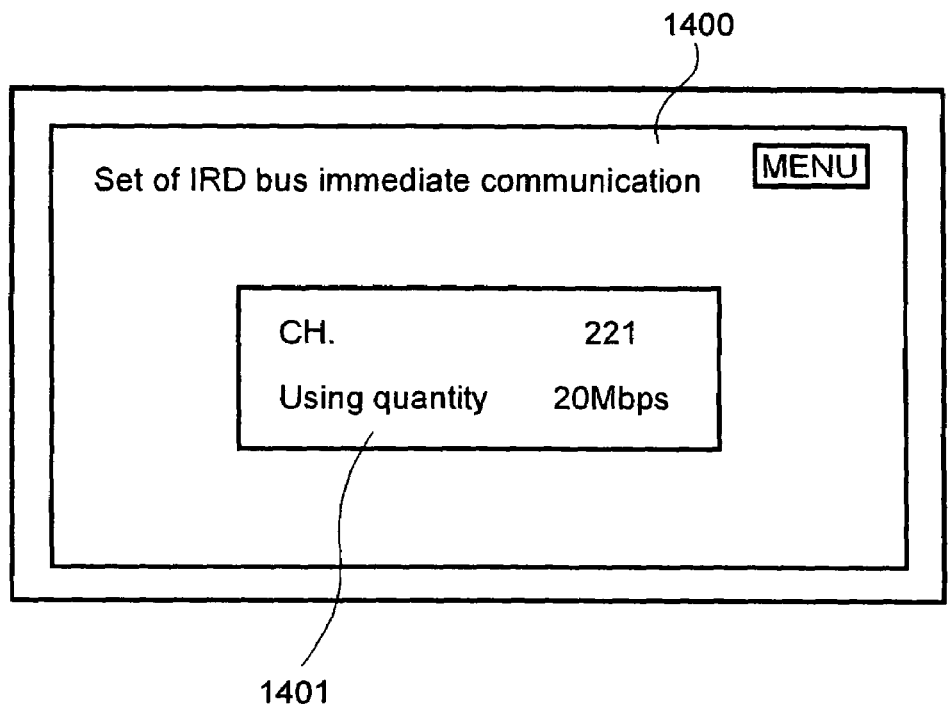
FIG. 14 is a diagram illustrating an example of an immediate communication display according to the preferred embodiment of the invention.

In step 1303, the bus width that is necessary for the communication of data, that is, desired bus usage information, is inputted and is stored in working RAM 209. For example, as shown at 1401 in FIG. 14, a designation of 20 MBPS is stored as the bus width that is necessary for the immediate communication.

In step 1304, it is determined whether the immediate communication is possible. The answer data and the immediate communication data are compared. The CPU 203 performs the judgment using a scan process of examining whether the requested time period that is to be reserved has already been reserved. It is also possible to subtract the bus width designated in the reservation request from the maximum bus width that is available in the requested time period and to perform the required judgment to determined if the reservation is possible by well-known processing. The available bus width that can be used at present is 80 MBPS, and the D-VTR has reserved use in the interval from 19:00 to 20:00 in the time zone in the future. Since the available bus width in the time period remains 50 MBPS, if the secured 20 MBPS for the immediate communication is subtracted from the available bus width, it can be seen that the 20 MBPS bus width for the immediate communication of the IRD 103 is available, and so the process advances to step 1305.

In step 1305, the immediate communication information is stored in the memory 204, and then the process advances to step 1306. FIG. 9 shows an example of the stored data structure. An immediate communication bus width field 900 carries information concerning the usage bus width. An immediate communication channel field 901 carries information as to the reserved reserving channel number. In step 1306, the immediate communication process is ended. At this point, execution of the immediate communication processing program, which was called from the ROM 210, is finished. The following is an explanation of the process carried out in the case of FIG. 4(b). The situation is the same as that of the above-mentioned case (2), except for the availability of bus width.

Figure 15:
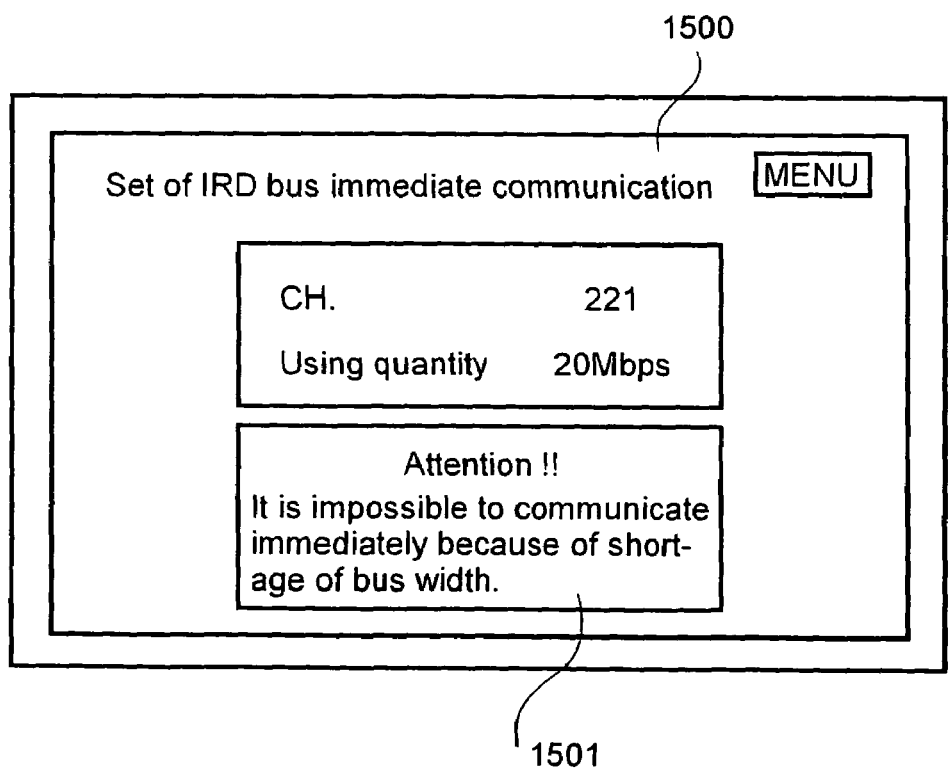
FIG. 15 is a diagram illustrating an example of a bus unavailable immediate communication display according to the preferred embodiment of the invention.

In step 1303, for example, a designation of 60 MBPS as the bus width that is necessary for immediate communication is stored in the working RAM 209. In this case, in step 1304, because the bus width is insufficient in the reserved time period of the D-VTR 101, it is judged that the bus width necessary for the immediate communication cannot be secured, and the process advances to step 1307. In step 1307, the reason why the immediate communication cannot be allowed is displayed, as seen at 1501 in FIG. 15, and the process advances to step 1308. In step 1308, it is determined whether the request for the immediate communication is to be retried again or ended. In case of the case of FIG. 4(b), if the immediate communication is changed so as to require communication only until the starting time of the D-VTR 101, it can be secured until 19:00.

The following is an explanation of the process carried out in the case of FIG. 4(c). The situation is the same as that of the above-mentioned case of FIG. 4(b) in that it also involves an insufficiency of bus width.

In step 1303, it will be assumed that a designation of bus width that is larger than 90 MBPS, representing the bus width that is necessary for the immediate communication, is stored in the working RAM 209. In this case, in step 1304, it is determined that the necessary bus width for the immediate communication is not available because the bus width is already insufficient at present, and so the process advances to step 1307. In step 1307, the reason why immediate communication cannot be allowed is displayed, and the process advances to step 1308. In step 1308, it is determined whether the request for immediate communication is to be retried again or ended. As mentioned above, the device that tries to obtain a reservation for use of the bus requests immediate communication information and reservation information from the devices connected to the bus. Then, the judgment as to the possibility of obtaining a reservation is performed based upon the answer information received from the other devices and the information received from the bus manager. Even in a case where the immediate communication cannot be allowed because of another reservation in the same time period, which is reserved by other devices, a reservation may be canceled by judging the priority of each user in the IRD103 and canceling in a reservation having a lower priority, thereby making immediate communication possible.

In this embodiment, the possibility of obtaining a reservation is determined in step 504, however, a restriction of the band width and channel number can be effected so as to allow immediate communication in a reserved time period easily. For example, if the band width and channel are set such that only 80% of the maximum value of each bus width and channel number are possible to make the reservation using a reservation processing program stored in the ROM 210, at least 20% of the maximum value of each bus width and channel number will be available for an immediate communication, even in a reserved time period.

Further, the system can display the tackling method that is reserved in which reservation of which device is canceled in the cases that it isn't possible to reserve the bus. Then, to secure the needed bus width when the bus width runs short, a calculation is made as to which reservation of other devices has to be canceled by the CPU 203 in the reservation processing of step 504, and the result is displayed on display unit 202 so that a reservation on reservations selected by the user may be canceled.

In the above-mentioned embodiment, all devices reply to a demand for bus usage information, but this can be performed with only the reservation device which is going to communicate in the future or communicate immediately.

Figure 16:
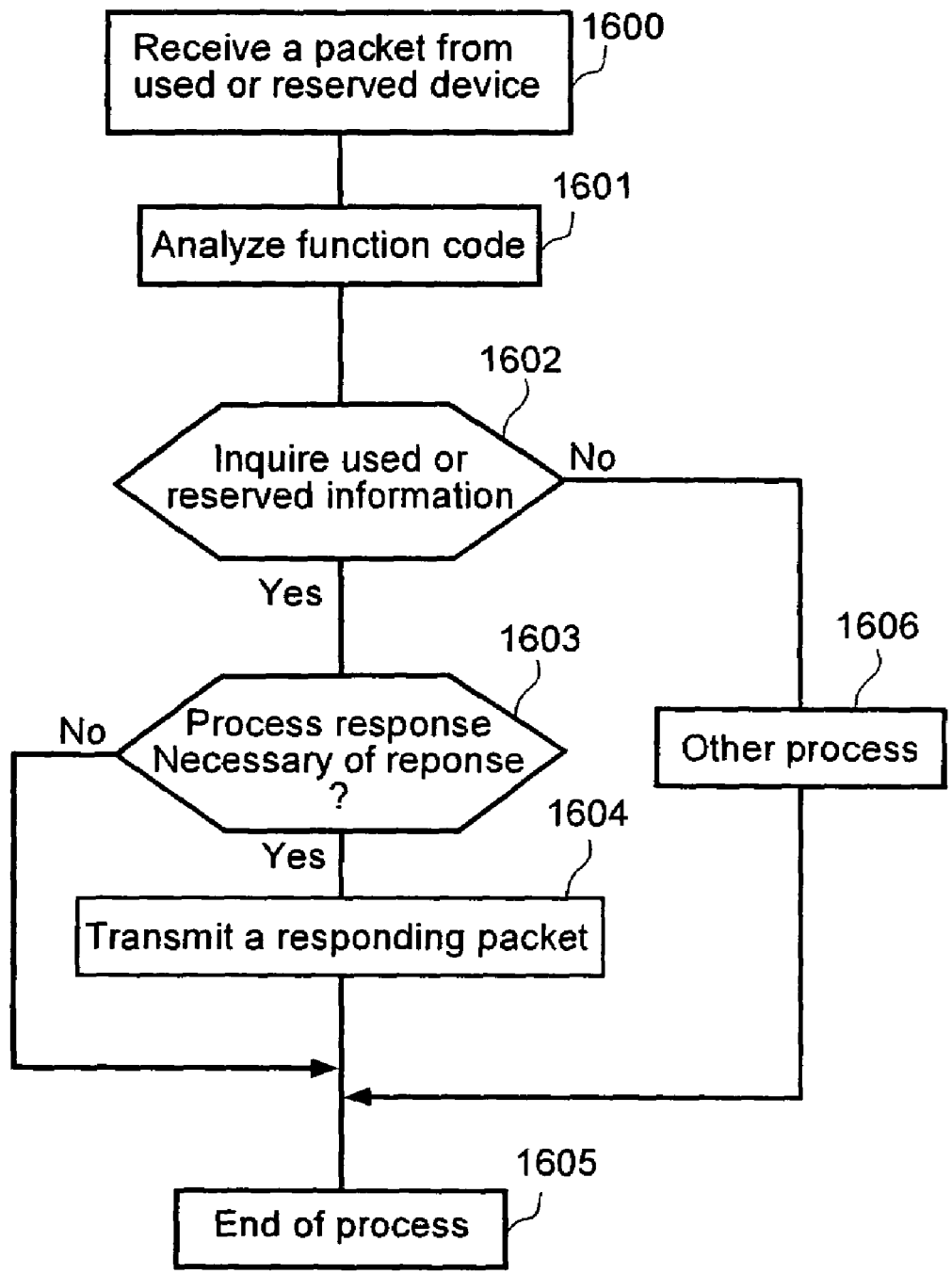
FIG. 16 is a flow chart illustrating a response process according to the preferred embodiment of the invention.

In FIG. 16, the example of a procedure for processing the information in the device that responds at this time is shown. In this figure, a case in which other electronic devices have transmitted the immediate communication information of the bus and an answer requirement packet of reservation information to IRD103 will be explained.

In step 1600, the process starts when the answer requirement packet is received. It is judged whether the communication unit 205 receives the packet including the function code of the answer requirement issued by the CPU 203, and, if the packet has been received, execution of an answer processing program stored in ROM 210 is started. In step 1601, the function code is decoded. The CPU 203 refers to the function code table in ROM 210 for this purpose, and the function code is interpreted. In step 1602, in case the function code is an answer requirement concerning a current usage or the present of a reservation, the process advances to step 1603. In case it is another function code, the process advances to step 1606.

In step 1603, the answer processing is performed. The CPU 203 refers to the memory 204 in order to examine whether the bus is reserved or is being used for immediate communication by its own device. If there is reservation information and immediate communication information, that information is expanded to the working RAM 210 and is adjusted to an answer format. If there is no reservation information and immediate communication information, the process advances to step 1605. In step 1604, an answer packet is transmitted. The answer packet adjusted to the answer format is transmitted from the communication unit 205. The program is ended in step 1605. The answer-processing program in the ROM 210 is ended. In step 1606, the CPU 203 performs the processing that corresponds to the function code, and the process advances to step 1605.

By this procedure, only the devices that have established a reservation or are involved in immediate communication can respond. Further, for example, IRD103 sends information identifying the time period that is to be reserved to each device, but only those devices that have a reservation during the same time period or that are using the bus at present can respond. In this case, the information identifying the time period that IRD103 wants to reserve is added to the function code 701. Further, for example, in the reservation answer processing program of the D-VTR 101, in step 1304, the D-VTR 101 judges if there is a reservation during the desired time period or there is a usage of the bus at present, and it may determine as a result whether it will send as answer packet.

Figure 17:
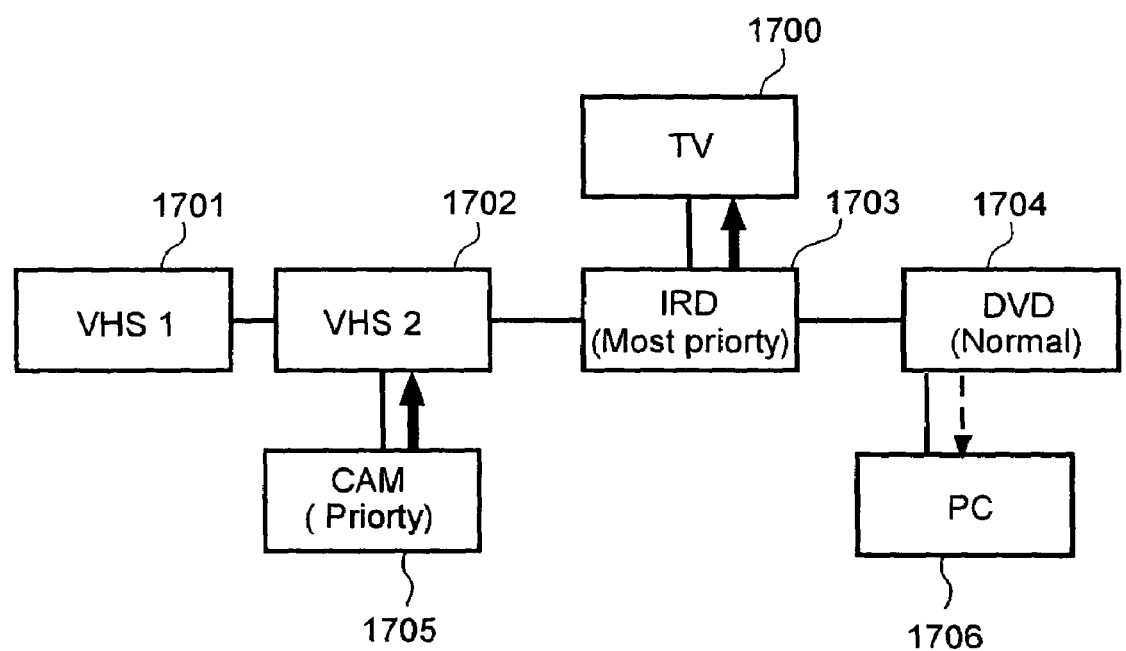
FIG. 17 is a block diagram illustrating an example of a system including degree of priority processing according to the preferred embodiment of the invention.
Figure 18:
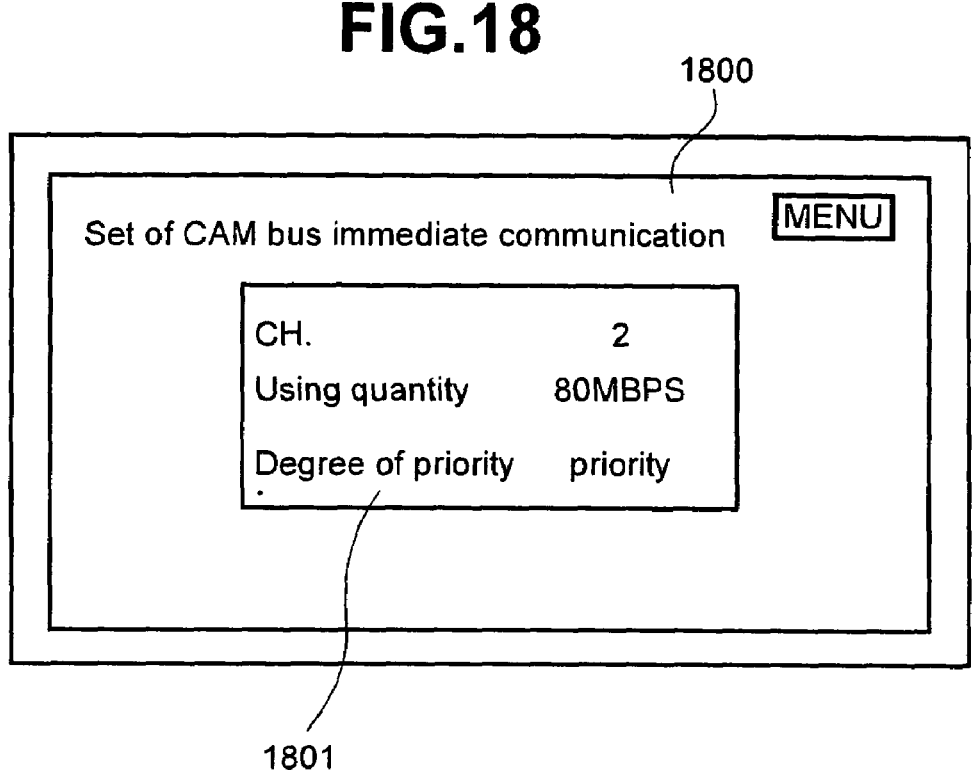
FIG. 18 is a diagram illustrating an example of a degree of priority processing of a CAM according to the preferred embodiment of the invention.
Figure 19:
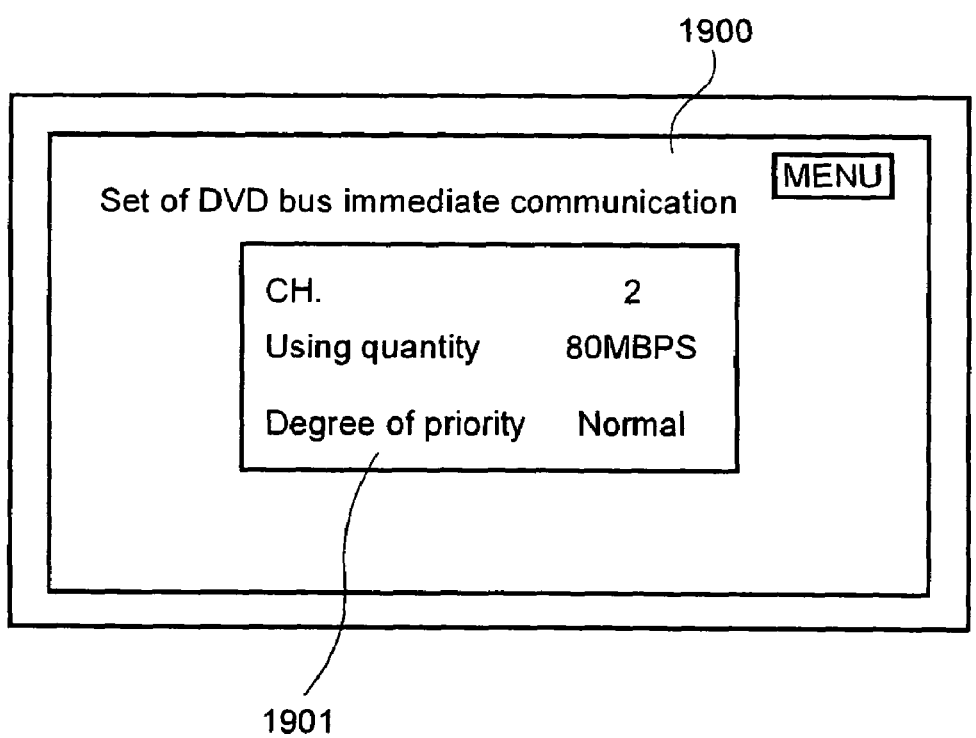
FIG. 19 is a diagram illustrating an example of a display of degree of priority processing of a DVD according to the preferred embodiment of the invention.
Figure 20:
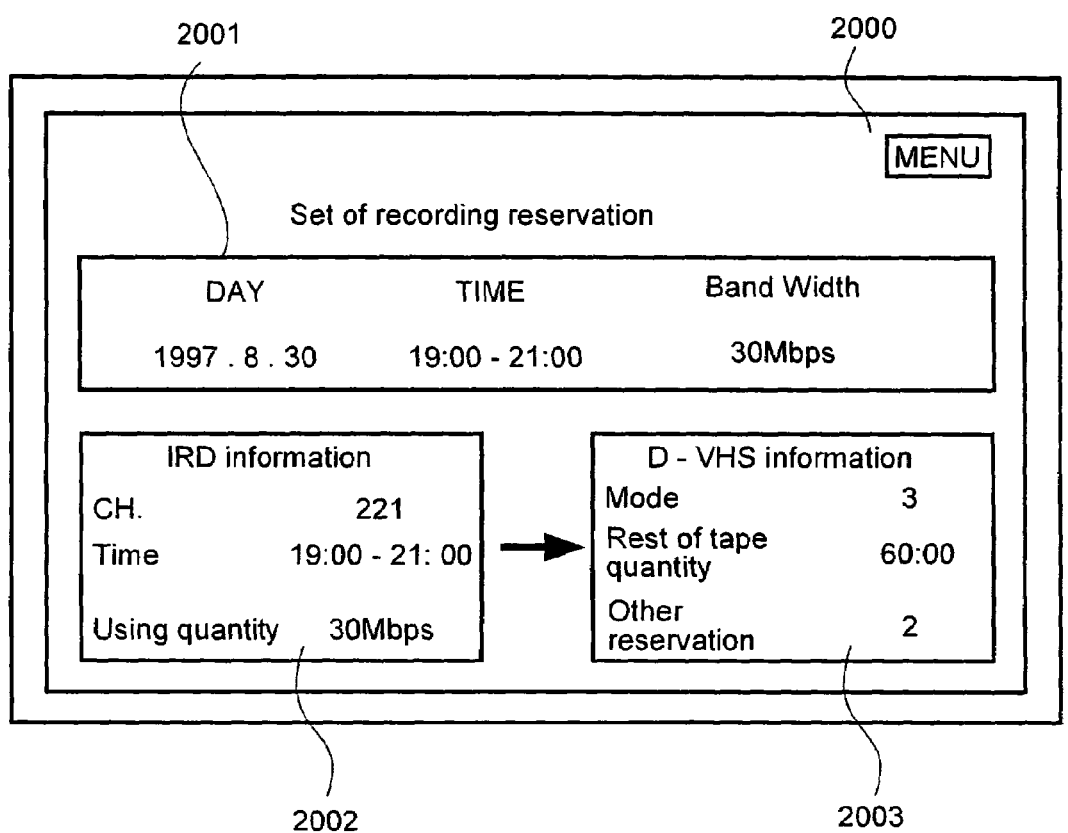
FIG. 20 is a diagram illustrating an example of a reservation operating display by a personal computer according to the preferred embodiment of the invention.

Further, a priority of the bus usage and the granting of reservations can be set up. This will be explained with reference to FIG. 17, FIG. 18 and FIG. 19 for a case in which it is desired to sent video information from a DVD1704 to a PC 1706 and also to perform a dubbing activity in a D-VTR 1702 from a CAM 1705. At this time, it is assumed that urgent information has been received from a broadcasting radio wave or a network through the IRD1703 and the PC 1706, and that this urgent information is to be displayed on a TV 1700. When there is an insufficient margin in the bus width, there is a possibility of not being able to display the urgent information. At this time, as seen at 1801 of FIG. 18, the priority of the bus usage for a video recording from the CAM 1705 to the D-VTR 1702 is set as "priority". Further, the priority of the bus usage for a soft playback from the DVD 1704 to the PC 1706 is set as "normal", as seen at 1901 in FIG. 19. Further, the priority of the bus usage for the transmission of urgent information from the IRD1703 to the TV 1700 is set as "most priority". In this case, even in the case where there is sufficient available bus width, the bus usage for the soft playback from the DVD 1704 to the PC 706, the priority of which is "normal", is stopped, and so the bus width that is necessary for transmission of the urgent information can be secured and the information can be displayed on the TV 1700. In case a PC1706 with a function that can control other devices is connected in the system, while a normal reservation operation is performed by each device, the reservation operation also can be performed by the PC1706 collectively. In FIG. 20, an example of the screen produced by the personal computer is shown. The screen 2000 is produced on a personal computer monitor. A bus resource that has secured a reservation time and date for use of the bus is displayed on a display window 2002. In the display window, the operation screen is displayed. Then, the reservation of a program and a time is set. The operation window of the D-VTR is displayed on a display window 2003. A mode of the video is set.

Figure 5:
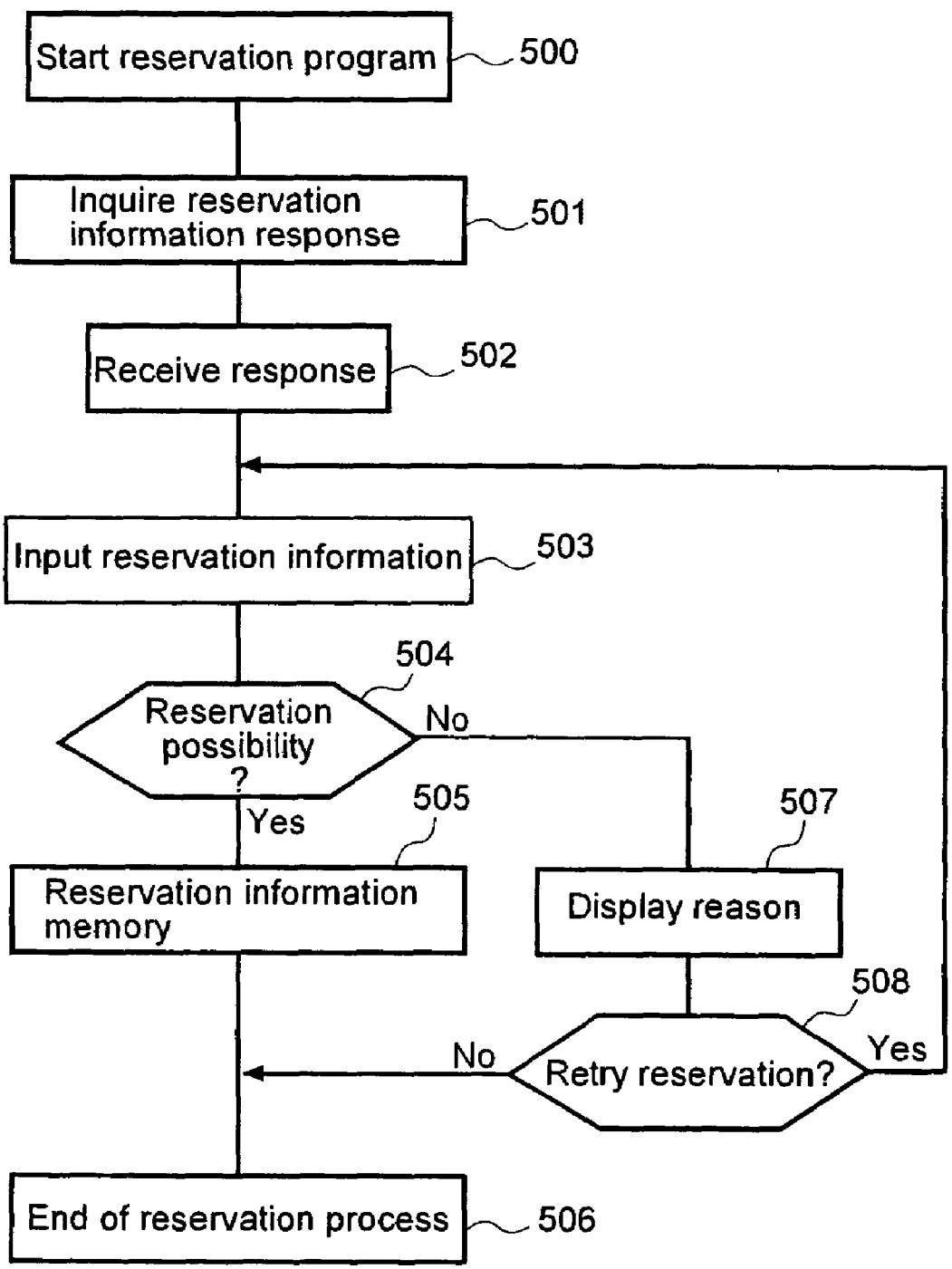
FIG. 5 is a flow chart illustrating a reservation process according to the preferred embodiment of the invention.

Further, it is assumed that a device is plugged or unplugged in the IEEE 1394 network and that a bus reset has occurred in FIG. 5. In this case, if the IRD 103 has a reservation to record a video program with the D-VTR 101 from the IRD 103, the IRD is unplugged from the network, as a whole, so that the possibility of sufficient reservation bus width in the network increases. A device that is using the bus or obtains a reservation calls step 500 and in step 501, it requests information from each of the devices that are connected to the bus again. Because each device stores its usage or reservation information in the memory 204, each device automatically transfers the information in step 503, and the current usage or reservation status of the bus is judged in step 504. If a problem does not arise, the process can return to a state which existed before the bus reset occurred. However, in case of not being able to return for some reason, in step 507, the reason why the process is not able to return is displayed.

Further, in the above-identified embodiment, in step 507, a warning screen is displayed as a means for displaying the reason why a reservation is impossible. However, the warning screen can be displayed on not only the TV monitor, but also on a liquid crystal screen of a remote-controller or an operation panel of a electronic device or a display apparatus. Instead of the warning screen, a warning sound, an audio message, or music may be outputted to an audio output device. In addition to that, a means that a user can visually recognize, such as a warning using a blinking light emitting diode, can be employed.

As mentioned above, since this invention is able to prevent a reservation that will exceed the bus transferring capacity, a reliable communication, such as at the time of recording, can be performed. Further, in case the reservation of the bus is impossible, the user can take steps to adjust the conditions to allow communication because the reason why the reservation is impossible is displayed.

Further, there is a case wherein, when a device attempts to start an immediate communication after having secured the bus, the device may not be able to complete the communication on the bus as a result of a reservation of the bus by another device in the future. In the case of a device that desires to effect an immediate communication or reserve a communication time, but cannot perform the communication because of bus usage, this invention gives a warning to the user by displaying information giving the reason for the problem.

What is claimed is:

1. In a system including a plurality of electronic devices connected to each other by a network, wherein each electronic device is capable of transmitting or receiving information to or from another electronic device via said network, each electronic device comprising:
   a transmitting unit for transmitting a request for network usage including network usage desired information indicating an amount of network usage desired to said another electronic device via said network; and
   a transmitting unit for transmitting network usage information answering said request for network usage from said another electronic device via said network in response to the transmitted request for network usage from said another electronic device via said network,
   wherein said network usage desired information and said network usage information includes at least information of a network transferring capacity, a starting time of network usage, and a finishing time of network usage, and
   wherein said network usage information is used to determine based on said network usage desired information an amount of permitted network usage by said electronic device.

2. In a system including a plurality of electronic devices connected to each other by a network, wherein each electronic device is capable of transmitting or receiving information to or from another electronic device via said network, each electronic device comprising:
   a transmitting unit for transmitting a request for network usage including network usage desired information indicating an amount of network usage desired to said another electronic device via said network;
   a receiving unit for receiving network usage information transmitted from said another electronic device in response to said request for network usage via said network,
   wherein said network usage desired information and said network usage information includes at least information of a network transferring capacity, a starting time of network usage, and a finishing time of network usage, and
   wherein said network usage information is used to determine based on said network usage desired information an amount of permitted network usage by said electronic device.

3. In a system including a plurality of electronic devices connected to each other by a network, wherein each electronic device is capable of transmitting or receiving information to or from another electronic device via said network, each electronic device comprising:
   a transmitting unit for transmitting a request for network usage including network usage desired information indicating an amount of network usage desired to said another electronic device via said network;
   a receiving unit for receiving network usage information transmitted from said another electronic device in response to said request for network usage via said network; and
   a judging unit for judging a possibility of network usage for a desired network usage time based upon said network usage information received from said another electronic device and said network usage desired information,
   wherein said network usage desired information and said network usage information includes at least a network transferring capacity, a starting time of network usage, and a finishing time of network usage information, and
   wherein said network usage information is used to determine based on said network usage desired information an amount of permitted network usage by said electronic device.

4. In a system including a plurality of electronic devices connected to each other by a network, wherein each electronic device is capable of transmitting or receiving information to or from another electronic device via said network, an electronic device network usage method, performed in each electronic device, comprising the steps of:
   transmitting inquiring information including network usage desired information indicating an amount of network usage desired to a second electronic device via said network from a first electronic device;
   receiving network usage information transmitted from said second electronic device via said network; and
   judging a possibility of said network usage based upon said received network usage information and said network usage desired information,
   wherein said network usage desired information and said network usage information includes at least information of a network transferring capacity, starting time of network usage, and finishing time of network usage,
   wherein said network usage information is used to determine based on said network usage desired information an amount of permitted network usage by said electronic device.

5. In a system including a plurality of electronic devices connected to each other by a network, wherein each electronic device is capable of transmitting or receiving information to or from another electronic device via said network, an electronic device network usage method, performed in each electronic device, comprising the steps of:
   transmitting inquiring information including network usage desired information to a second electronic device via said network from a first electronic device; receiving network usage information transmitted from said second electronic device via said network; and
   judging a possibility of said network usage based upon said received network usage information and said network usage desired information,
   wherein said network usage information is extracted when said network usage information stored in said second electronic device corresponds to said network usage desired information, and
   wherein said network usage desired information and said network usage information includes at least information of a network transferring capacity, starting time of network usage, and finishing time of network usage.

6. An electronic device for use in a system including a plurality of electronic devices connected to each other by a network, wherein each electronic device is capable of transmitting or receiving information to or from another electronic device via said network, said electronic device comprising:
   a communicating unit for transmitting or receiving information to or from a second electronic device via a network;

a processing unit for producing information to be transmitted via the communicating unit and for processing information to be received via the communicating unit; and a storing unit for storing therein information used in a processing operation at the processing unit, wherein the processing unit creates a network usage information transmitting request including network usage desired information that requests the second electronic device connected thereto via the network to transmit network usage information including a start time, a finish time and a required bandwidth of the network usage, and transmits the network usage information transmitting request through the communicating unit, receives network usage information relating to the network usage information transmitting request, judges whether the network relating to said network usage desired information can be used by comparing the network usage information received with said network usage desired information including a desired network usage start time and a desired network usage finish time of said electronic device, and if the network relating to said network usage desired information can be used, stores the network usage information based on said network usage desired information in the storing unit.

7. An electronic device according to claim 6, wherein when the request of transmitting the network usage information is made, the request of transmission is made at the second electronic device with the desired network usage start time and the desired network usage finish time of said electronic device being attached thereto.

8. An electronic device for use in a system including a plurality of electronic devices connected to each other by a network, wherein each electronic device is capable of transmitting or receiving information to or from another electronic device via said network, said electronic device comprising:

a communicating unit for transmitting or receiving information to or from a second electronic device via a network;

a processing unit for producing information to be transmitted via the communicating unit for processing information to be received via the communicating unit; and a storing unit for storing therein information used in processing operation at the processing unit, wherein, when the communicating unit receives a network usage information transmitting request including network usage desired information indicating an amount of network usage desired via the network, the processing unit transmits the network usage information including the start time, the finish time and the desired bandwidth of the network usage stored in the storing unit, via the transmitting unit, and wherein said network usage information is used to determine based on said network usage desired information an amount of permitted network usage by said electronic device.

9. An electronic device for use in a system including a plurality of electronic devices connected to each other by a network, wherein each electronic device is capable of transmitting or receiving information to or from another electronic device via said network, said electronic device comprising:

a communicating unit for transmitting or receiving information to or from a second electronic device via a network:

a Processing unit for producing information to be transmitted via the communicating unit for processing information to be received via the communicating unit; and a storing unit for storing therein information used in processing operation at the processing unit, wherein, when the communicating unit receives a network usage information transmitting request including network usage desired information via the network, the processing unit transmits the network usage information including the start time, the finish time and the desired bandwidth of the network usage stored in the storing unit, via the transmitting unit, and wherein when the transmitting unit receives the desired network usage start time and the desired network usage finish time, together with the network usage information transmitting request, the network usage information including a time period overlapping a time period indicated by the desired network usage start time and the desired network usage finish time, of the network usage information stored in the storing unit is extracted and transmitted via the communicating unit.

10. An electronic device for use in a system including a plurality of electronic devices connected to each other by a network, wherein each electronic device is capable of transmitting or receiving information to or from another electronic device via said network, said electronic device comprising:

a transmitting unit for transmitting network usage desired information that requests network usage information including a network usage start time, a network usage finish time and a desired bandwidth to the second electronic device; and a receiving unit for receiving network usage information transmitted from the second electronic device based on said network usage desired information that requests the network usage information transmitted to the second electronic devices via the network, wherein the network usage information received is compared with the network usage desired information including the desired network usage start time and the desired network usage finish time of said electronic device to thereby judge whether or not the network can be used.

* * * * *